(12) United States Patent
Therani et al.

(10) Patent No.: US 11,405,482 B2
(45) Date of Patent: Aug. 2, 2022

(54) METHOD FOR LINKING IDENTIFIERS TO GENERATE A UNIQUE ENTITY IDENTIFIER FOR DEDUPLICATING HIGH-SPEED DATA STREAMS IN REAL TIME

(71) Applicant: Near Pte. Ltd., Singapore (SG)

(72) Inventors: Madhusudan Therani, San Jose, CA (US); Shobhit Shukla, Bangalore (IN)

(73) Assignee: Near Intelligence Holdings, Inc., Pasadena, CA (US)

( * ) Notice: Subject to any disclaimer, the term of this patent is extended or adjusted under 35 U.S.C. 154(b) by 0 days.

(21) Appl. No.: 16/792,226

(22) Filed: Feb. 15, 2020

(65) Prior Publication Data
US 2021/0258400 A1     Aug. 19, 2021

(51) Int. Cl.
*H04L 67/5682* (2022.01)
*G06N 20/00* (2019.01)
(Continued)

(52) U.S. Cl.
CPC ........ *H04L 67/2852* (2013.01); *G06K 9/6278* (2013.01); *G06N 20/00* (2019.01); *H04L 67/146* (2013.01); *H04W 4/029* (2018.02)

(58) Field of Classification Search
None
See application file for complete search history.

(56) References Cited

U.S. PATENT DOCUMENTS

| 2013/0054689 A1* | 2/2013 | Woldman | H04N 21/6581 709/204 |
| 2013/0124474 A1* | 5/2013 | Anderson | G06F 16/20 707/634 |

(Continued)

*Primary Examiner* — Kevin T Bates
*Assistant Examiner* — Emad Siddiqi

(57) ABSTRACT

A processor-implemented method for linking identifiers to generate a unique entity identifier for deduplicating high-speed data streams in real time, the method comprising (i) obtaining one or more data streams with an identifier from independently controlled entities, wherein the one or more data streams comprises timestamp data and location indexed data that partially characterizes an activity of an entity, (ii) determining home location or internet protocol address of the entity by analyzing data obtained from the one or more data streams, (iii) clustering entity devices based on an association between an internet protocol address, a real-time event, a period of time or a location, (iv) disambiguating the clusters of entity devices into sub-clusters that resolve to an entity by analyzing data streams until a candidate pair of identifiers is obtained, (v) generating score for the candidate pair using a machine learning classifier to discern the candidate pair of identifiers into to same or different entity, (vi) filtering the candidate pair of identifiers by comparing the score with a predetermined threshold value, (vii) evaluating filtered candidate pair of identifiers to generate a unique entity identifier for the entity, (viii) refining the unique entity identifier in real-time using a feedback loop based on a test engagement activity, and (ix) deduplicating one or more data streams that are associated with the unique entity identifier in real time by validating entity attributes linked with the unique entity identifier with the attributes observed in a first data stream and a second data stream of the test engagement activity.

19 Claims, 8 Drawing Sheets

(51) Int. Cl.
*H04L 67/146* (2022.01)
*G06K 9/62* (2022.01)
*H04W 4/029* (2018.01)

(56) References Cited

U.S. PATENT DOCUMENTS

2016/0261621 A1* 9/2016 Srivastava .......... H04L 63/1425
2019/0102791 A1* 4/2019 Park .................. G06F 16/24568
2020/0336400 A1* 10/2020 Juen ........................ H04L 67/18

* cited by examiner

| TIME<br>LOCATION<br>CLUSTERS | MORNING<br>SOHO<br>C1, C2, P1, P2, T1<br>C3, C4, C5...C526<br>P3, P4, P5...P321<br>T2, T3...T27 | NOON<br>PRET A MANAGER<br>C1, P1, P2<br>C527, C528...C564<br>P321, P322...P480<br>T28, T29...T47 | EVENING<br>VIRGIN ACTIVE<br>P1, P2, T1<br>C565, C566...C789<br>P481, P482...P503<br>T48, T49...T81 | LATE NIGHT<br>MAYFAIR<br>C1, P1, T1<br>C790, C791...C782<br>P594, P595...P603<br>T82, T83...T87 | WEEKENDS<br>STADIUM<br>P1, P2<br>C873, C874...C1063<br>P604, P605...P892<br>T88, T89...T127 |
|---|---|---|---|---|---|

| TIME | MORNING | NOON | EVENING | LATE NIGHT | WEEKENDS |
|---|---|---|---|---|---|
| LOCATION | SOHO | PRET A MANAGER | VIRGIN ACTIVE | MAYFAIR | STADIUM |
| CLUSTERS | C1,P1,P2,T1 | C1,P1,P2 | P1,P2,T1 | C1,C2,P1,T1 | P1,P2 |
|  | C3, C4, C5...C526 | C527, C528...C564 | C565, C566...C789 | C790, C791...C782 | C873, C874...C1063 |
|  | P3, P4, P5..P321 | P321, P322..P480 | P481, P482..P503 | P594, P595..P603 | P604, P605..P892 |
|  | T2, T3..T27 | T28, T29..T47 | T48, T49..T81 | T82, T83..T87 | T88, T89..T127 |

UNIQUE USER IDENTIFIER "9517ANR"

MALE 26-35, BUSINESS PROFESSIONAL, FITNESS FREAK, AFFLUENT, GAMER, LOVES SOCCER, TENNIS

```
┌─────────────────────────────────────────────────────────────────────────┐
│  OBTAINING, IN REAL TIME, A PLURALITY OF DATA STREAMS WITH AT LEAST ONE │
│  IDENTIFIER FROM INDEPENDENTLY CONTROLLED ENTITIESSOURCES, WHEREIN THE  │
│  PLURALITY OF DATA STREAMS COMPRISES TIMESTAMP DATA AND LOCATION INDEXED│
│  DATA THAT PARTIALLY CHARACTERIZES AN ACTIVITY OF AN ENTITY ASSOCIATED  │
│  WITH THE AT LEAST ONE UNIQUE ENTITY IDENTIFIER                         │
│                                   602                                    │
└─────────────────────────────────────────────────────────────────────────┘
                                    │
                                    ▼
┌─────────────────────────────────────────────────────────────────────────┐
│  DETERMINING AT LEAST ONE OF A HOME LOCATION OR AN INTERNET PROTOCOL    │
│  ADDRESS OF THE PLURALITY OF ENTITY DEVICES ASSOCIATED WITH THE AT LEAST│
│  ONE IDENTIFIER BY ANALYZING DATA OBTAINED FROM THE PLURALITY OF DATA   │
│  STREAMS                                                                 │
│                                   604                                    │
└─────────────────────────────────────────────────────────────────────────┘
                                    │
                                    ▼
┌─────────────────────────────────────────────────────────────────────────┐
│  CLUSTERING IN REAL-TIME, USING AN UNSUPERVISED MACHINE LEARNING MODEL, │
│  THE A PLURALITY OF USER ENTITY DEVICES BASED ON AN ASSOCIATION BETWEEN │
│  THE PLURALITY OF ENTITY USER DEVICES IN AT LEAST ONE OF AN INTERNET    │
│  PROTOCOL ADDRESS, A REAL-TIME EVENT, A PERIOD OF TIME OR A LOCATION    │
│                                   606                                    │
└─────────────────────────────────────────────────────────────────────────┘
                                    │
                                    ▼
┌─────────────────────────────────────────────────────────────────────────┐
│  DISAMBIGUATING THE CLUSTERS OF THE PLURALITY OF ENTITY USER DEVICES    │
│  INTO SUB-CLUSTERS THAT RESOLVE TO AN ENTITY BY ANALYZING THE PLURALITY │
│  OF DATA STREAMS UNTIL A CANDIDATE PAIR OF IDENTIFIERS IS OBTAINED      │
│                                   608                                    │
└─────────────────────────────────────────────────────────────────────────┘
                                    │
                                    ▼
┌─────────────────────────────────────────────────────────────────────────┐
│  GENERATING A SCORE FOR THE CANDIDATE PAIR OF IDENTIFIERS USING A       │
│  MACHINE LEARNING CLASSIFIER BASED ON AT LEAST ONE OF A SHARED HISTORY  │
│  OF THE IDENTIFIERS, A LOCATION AND THE USER PLURALITY OF ENTITY DEVICES│
│  THAT CORRESPOND TO THE SUB-CLUSTERS TO DISCERN THE CANDIDATE PAIR OF   │
│  IDENTIFIERS INTO TO CORRESPOND TO SAME OR DIFFERENT ENTITY             │
│                                   610                                    │
└─────────────────────────────────────────────────────────────────────────┘
                                    │
                                    ▼
                                   (A)
```

FIG. 6A

METHOD FOR LINKING IDENTIFIERS TO GENERATE A UNIQUE ENTITY IDENTIFIER FOR DEDUPLICATING HIGH-SPEED DATA STREAMS IN REAL TIME

BACKGROUND

Technical Field

Embodiments of this disclosure generally relate to unification of identifiers, and more particularly, to a method for linking identifiers to generate a unique entity identifier for deduplicating high-speed data streams in real time.

Description of the Related Art

With ever increasing digitization, an entity and different events associated with the entity are encoded in a number of data formats, recorded and transmitted in a variety of streams depending on the nature of the device, the application generating the event and the source of the data. For integrating this disparate data, a fundamental issue is the use of multiple identifiers for a single entity across multiple data sources. Identifier (ID) unification is one of the key data fusion problems when integrating data from multiple data sources. Data of an entity which is obtained in a data stream is associated with these identifiers. These identifiers not only help to access the data but also aid in engaging with the entity depending on the channel on which the entity is active, for example, cookies on a browser, ad identifiers on a mobile device, mobile device identifiers, social media handles, network identifiers such as mac address, user name for a social account, CRM/Loyalty System numbers/identifiers, personal identifiable information, or e-mail IDs via e-mail. The problem is further complicated as there may be a plurality of entities using a single entity device as well as single entity using a plurality of entity devices such as all mobile phones sharing an hotspot identified by the hotspot identifier. Also, when a new user device comes on board, it needs to be matched to an old entity device profile. Hence, it becomes exponentially difficult to obtain and maintain a holistic profile of an entity.

Linking the various set of identifiers for a single entity is highly important for maintaining attributes for each entity associated with these identifiers. The attributes may include at least one of browsing habits, app engagement information, access times, locations or transaction information. Linking an entity's behavior to their unique entity identifier enables consolidation of data for each entity which remains essential for pre and post campaign analyses. Further, obtaining a better understanding of the entity's requirements is essential for engaging with them in a meaningful way that is in line with entity attributes of the entity.

Approaches for linking identifiers vary across vendors and different enterprises for realizing common knowledge about an entity by fusing the data available across multiple sources but the problem occurs due to availability of partial data and the mere size of data, which is in several gigabytes, being received on a daily basis, which also requires large-scale data cleaning to remove noisy data. Further, much of the data obtained in the data streams is either partial or incorrect. This partial data is referred to as data exhaust or exhaust data, which is the trail of data left by the activities of internet or other computer system entities during their online activity, behavior and transactions. This category of unconventional data includes geospatial, network, and time-series data which may be useful for predictive purposes. An enormous amount of raw data is created, which can be in the form of cookies, temporary files, log files, storable choices, and more. Further, the data streams (i.e. partially observable data streams) are from independently controlled sources. The independently controlled sources are source of the data stream that controls a variety of aspects such as the attributes which are collected, frequency and means of data being collected, format of data, format of populating the data stream and the definition of unique identifier. In the partially observable data stream, certain events on the timeline are missed since the end point collecting data streams does not see all of the events in the timeline due to reasons such as events being dropped due to outages, sensor failure, network unavailability, intermediaries in the flow or shutting off devices. As these aspects vary for each of the partially observable data streams from independently controlled sources, the complexity increases exponentially. The complex aspects of working with exhaust data is getting a single holistic view around it wherein cleaning up and unifying that data remains a big challenge. Hence, the scaling and unification of these large and high speed data streams is essential and deduplication requires to be done in real-time, as it is impossible to be performed manually because of the sheer size of the data and also because the data has a shelf-life.

Accordingly, there remains a need for a system and method that supports scale, frequent changes and has the ability to cope with the partial data for linking identifiers to generate a unique entity identifier for deduplicating high-speed data streams in real time.

SUMMARY

In the view of the foregoing, an embodiment herein provides method for linking identifiers to generate a unique entity identifier for deduplicating high-speed data streams in real time. The method includes the steps of (a) obtaining, in real time, a plurality of data streams with at least one identifier from independently controlled sources, wherein the plurality of data streams comprises timestamp data and location indexed data that partially characterizes an activity of an entity associated with the at least one identifier, (b) determining at least one of a home location or an internet protocol address of the plurality of entity devices associated with the at least one identifier by analyzing data obtained from the plurality of data streams, (c) clustering in real-time, using an unsupervised machine learning model, a plurality of entity devices based on an association between the plurality of entity devices in at least one of an internet protocol address, a real-time event, a period of time or a location, (d) disambiguating the clusters of the plurality of entity devices into sub-clusters that resolve to an entity by analyzing the plurality of data streams until a candidate pair of identifiers is obtained, (e) generating a score for the candidate pair of identifiers using a machine learning classifier based on at least one of a shared history of the identifiers, a location and the plurality of entity devices that correspond to the sub-clusters to discern the candidate pair of identifiers to correspond to same or different entity, (f) filtering the candidate pair of identifiers using the machine learning classifier by comparing the score of candidate pair of identifiers with a predetermined threshold value, (g) evaluating filtered candidate pair of identifiers to generate a unique entity identifier for the entity by comparing entity attributes of the entity associated with each identifier in the candidate pair of identifiers, (h) refining the unique entity identifier in real-time using a feedback loop to engage with the entity associated with the unique entity identifier based on a test engagement activity, and (i) deduplicating the plurality of data streams that are associated with the unique entity identifier in real time by validating entity attributes linked with the unique entity identifier with the attributes observed in a first data stream and a second data stream of the test engagement activity.

In another embodiment, the plurality of data streams comprises at least one of (i) location pings from a plurality of applications engaged on the plurality of entity devices, (ii) access pings from wireless hot-spots, (iii) active subscriber's data & location in different geo-areas from a mobile network, or (iv) a local information from traffic sensors and public cameras.

In one embodiment, the plurality of data streams comprises event streams, wherein event streams include web traffic to a global website and public activity on social media services.

In an embodiment, the unique entity identifier is refined in real time with respect to the incoming data streams, wherein the method rerun if inconsistent data is observed.

In an embodiment, personally identifiable information and non-personally identifiable information of an entity are linked with the unique entity identifier.

In an embodiment, linking the unique entity identifier of the entity to home location of the entity for providing persistence to the unique entity identifier.

In an embodiment, filtering and ranking candidate pair of identifiers using a data fusion and Bayesian updating technique based on an additional contextual data corresponding to the identifiers and the entity behavior for enabling temporal additivity with changing entity behavior.

In an embodiment, a private unique entity identifier graph is created and maintained for the new data source by combining data from a new data source is combined with the data associated with the unique entity identifier.

In an embodiment, the at least one identifier of the plurality of entity devices include at least one of an advertisement identifier, a cookie identifier or a social media identifier.

In yet another embodiment, a system for linking identifiers associated with data streams to generate a unique entity identifier for deduplicating high-speed data streams in real time, the system comprising (a) an identity management server that obtains, in real time, a plurality of data streams with at least one identifier from independently controlled sources, wherein the plurality of data streams comprises timestamp data and location indexed data that partially characterizes an activity of an entity associated with the at least one identifier, the identity management server further comprising (i) a database that stores information including attributes, identifiers, data streams, (ii) a clustering module that clusters in real-time, using an unsupervised machine learning model, a plurality of entity devices based on an association between the plurality of entity devices in at least one of an internet protocol address, a real-time event, a period of time or a location, (iii) a disambiguation module that disambiguates the clusters of the plurality of entity devices into sub-clusters that resolve to an entity by analyzing the plurality of data streams until a candidate pair of identifiers is obtained, generates a score for the candidate pair of identifiers using a machine learning classifier based on at least one of a shared history of the identifiers, a location and the plurality of entity devices that correspond to the sub-clusters to discern the candidate pair of identifiers to correspond to same or different entity, and filters the candidate pair of identifiers using the machine learning classifier by comparing the score of candidate pair of identifiers with a predetermined threshold value, and (iii) a validation module that evaluates filtered candidate pair of identifiers to generate a unique entity identifier for the entity by comparing entity attributes of the entity associated with each identifier in the candidate pair of identifiers, refines the unique entity identifier in real-time using a feedback loop to engage with the entity associated with the unique entity identifier based on a test engagement activity, and deduplicates the plurality of data streams that are associated with the unique entity identifier in real time by validating entity attributes linked with the unique entity identifier with the attributes observed in a first data stream and a second data stream of the test engagement activity.

In another aspect, one or more non-transitory computer-readable storage mediums storing the one or more sequences of instructions, which when executed by the one or more processors, causes to perform a method for linking identifiers associated with data streams to generate a unique entity identifier for deduplicating high-speed data streams in real time is provided.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications

BRIEF DESCRIPTION OF THE DRAWINGS

The embodiments herein will be better understood from the following detailed description with reference to the drawings, in which:

FIG. 5 is an exemplary disambiguation data table of a disambiguation module of the identity management server of FIG. 2 according to an embodiment herein;

FIGS. 6A and 6B is a flow chart that illustrates a method of linking identifiers that are obtained from data streams to form a unique entity identifier for cross-device identity matching according to an embodiment herein.

DETAILED DESCRIPTION OF PREFERRED EMBODIMENTS

Figure 1:
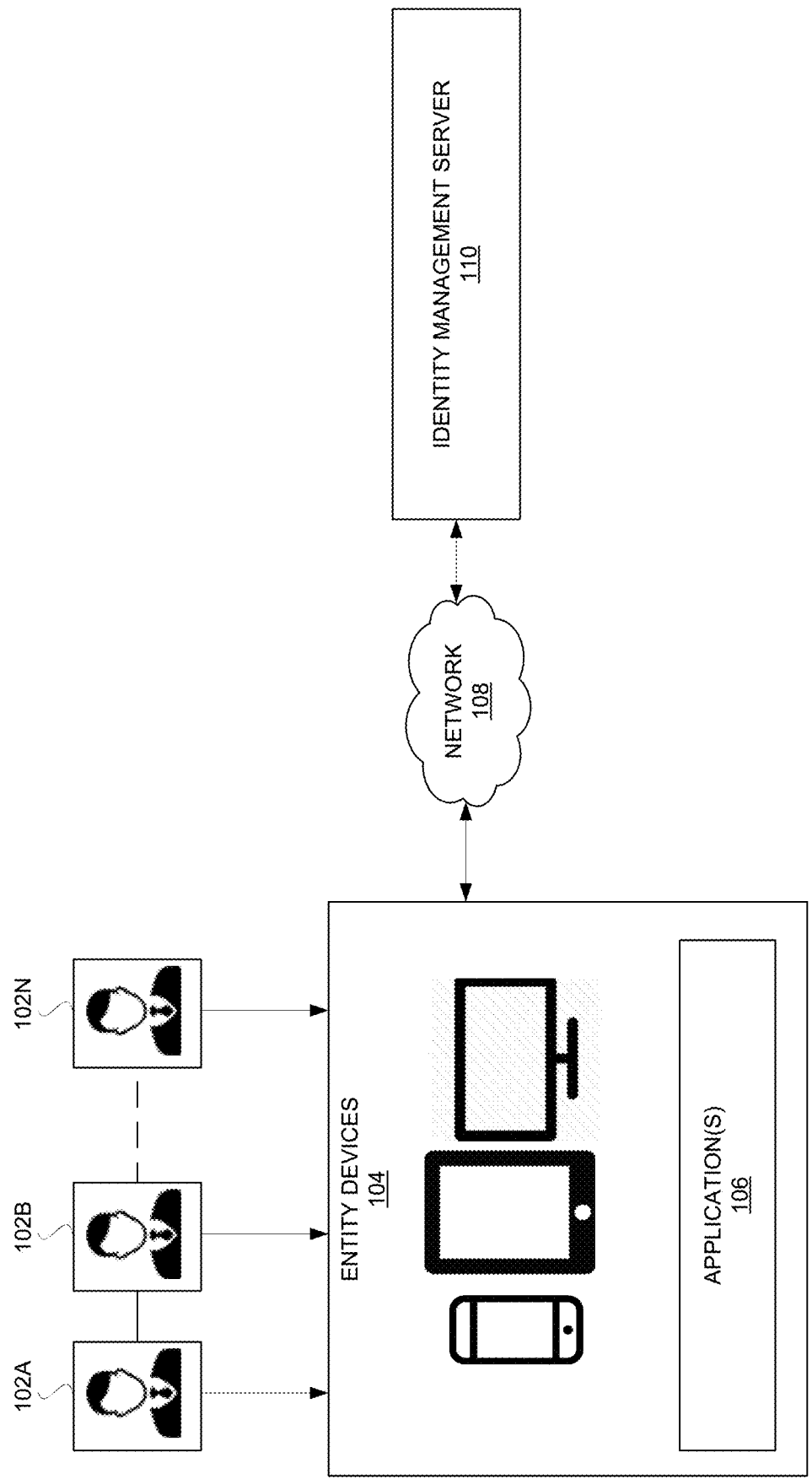
FIG. 1 is a schematic diagram that illustrates an interaction between entity devices and an identity management server for linking identifiers that are obtained from one or more data streams to form a unique entity identifier by deduplicating high speed data streams in real-time, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments.

There remains a need for a system and method that supports scale, frequent changes and has the ability to cope with partial data for linking identifiers to generate a unique entity identifier for engaging with an entity through an interactive media content. Referring now to the drawings, and more particularly to FIGS. 1 through 7, where similar reference characters denote corresponding features consistently throughout the figures, there are shown preferred embodiments.

The term "independently controlled sources" refers to any source that may control or standardize different aspects of data streams. The different aspects include but not limited to 1) What data can be collected?, 2) When and where the data is collected?, 3) How the data is collected?, 4) How collected data can be modified?, 5) What data is public, 6) What data is protected?, 7) What data can be permitted by a consumer/user of the application/device?, and 8) What data is completely private?

The term "partial observable data or partial data" refers to a data stream where all the events are not captured due to several reasons.

The term "one or more streams from independently controlled sources" refers to data stream from independently controlled sources. For example, consider a consumer using multiple applications on his android phone, as he/she interacts with each application, multiple independent streams of events are produced since, each application being an independent source. Events and entities may have different identifiers across different applications depending on how it is implemented. Additionally, if one were to monitor the network, each application level event may generate additional lower level network events.

FIG. 1 is a schematic diagram that illustrates an interaction between entity devices and an identity management server for linking identifiers that are obtained from one or more data streams to form a unique entity identifier by deduplicating high speed data streams in real-time, according to an embodiment herein. The system view includes one or more entity devices 104 that are associated with one or more entities 102A-N that are connected via a network 108 and an identity management server 110. The one or more entity devices 104 including personal computers, mobile devices, or other computing device. The one or more entity devices 104 include one or more applications 106. The one or more applications 106 may include but not limited to a browser application, another type of application that communicates with one or more systems, or any other application that can collect behavior of the entity. In one embodiment, the network 108 includes a wireless network or a wired network. In one embodiment, the one or more entity devices 104 include but not limited to a mobile device, a smart phone, a personal digital assistant (PDA), a notebook, a Global Positioning System (GPS) device, or any network enabled device. In one embodiment, the one or more data streams include location indexed data. In one embodiment, the location indexed data includes latitude data and longitude data. In one embodiment, the one or more data streams include non-location indexed data. In one embodiment, the non-location indexed data includes Internet Protocol (IP) information. In one embodiment, the one or more data streams includes (i) location pings from one or more application engaged on the one or more entity devices 104, (ii) access pings from wireless hot-spots, (iii) active subscriber's data & location in different geo-areas (GSM) from the mobile network, and (iv) local information from traffic sensors or a public CCTV camera for security and others. In some embodiments, the one or more data streams include digital visit count to a global website and social media activities.

Figure 2:
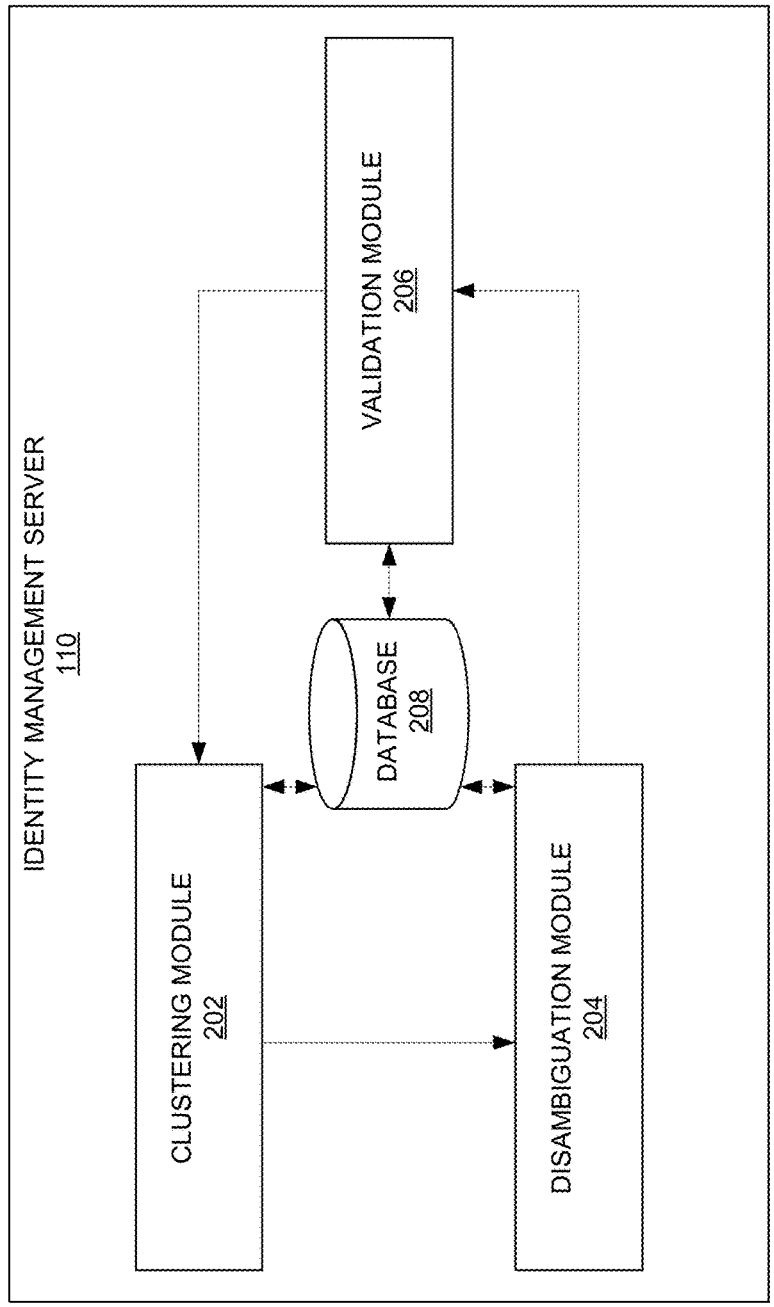
FIG. 2 is an exploded view of an identity management server of FIG. 1 according to an embodiment herein.

FIG. 2 is an exploded view of the identity management server 110 of FIG. 1 according to an embodiment herein. The identity management server 110 includes a clustering module 202, a disambiguation module 204, a validation module 206 and a database 208. The identity management server 110 obtains a plurality of data streams with at least one identifier that includes time stamped data and location indexed data which partially characterizes an activity of an entity associated with the unique entity identifier over a network 108. In an embodiment, the network includes but not limited a wireless network and a wired network. The clustering module 202 is embedded with an unsupervised machine learning model to cluster the one or more entity devices 104 by identifying the one or more entity devices 104 having an association with each other in at least one of an internet protocol address, a real-time event, a period of time or a location. In an embodiment, the identifiers associated with the one or more entity devices 104 include an advertisement identifier, a cookie identifier or a social media identifier. In an embodiment, the clustering module 202 determines at least one of a home location or an internet protocol address of the one or more entity devices 104 associated with the one or more identifier by analyzing data obtained from the plurality of data streams. In one embodiment, the clustering module 202 clusters the one or more entity devices 104 that are seen together based on a single IP address, within a given time-window, and, if available, in the same vicinity (or location).

The disambiguation module 204 (i) disambiguates the clusters of entity devices 104 into sub-clusters that resolve to an entity by analyzing the one or more data streams until a candidate pair of identifiers is obtained, (ii) generates a score for the candidate pair of identifiers using a machine learning classifier based on at least one of a shared history of the identifiers, a location and the entity devices that correspond to the sub-clusters to discern the candidate pair of identifiers corresponding to same or different entity, and (iii) filters the candidate pair of identifiers using the machine learning classifier by comparing the score of candidate pair of identifiers with a predetermined threshold value and (iv) evaluates filtered candidate pair of identifiers to generate a unique entity identifier for the entity by comparing entity attributes of the entity associated with each identifier in the candidate pair identifier. The validation module 206 (i) refines the unique entity identifier in real-time using a feedback loop for engaging with the entity associated with the unique entity identifier based on a test engagement activity and (ii) validates entity attributes linked with the unique entity identifier with the attributes observed in the test engagement activity by deduplicating high speed data streams that are associated with the unique entity identifier in real time. The feedback loop utilizes additional attributes from at least one of offline and online identifiers. The database 208 stores information including attributes, identifiers, data streams, etc.

In an embodiment, the clustering module 202 embeds the unsupervised learning techniques for clustering the entity devices 104 to collect clusters of entities that share common entity attributes and their respective values. The clustering module 202 runs periodically to process the one or more data streams and generate clusters for further processing. In an embodiment, the time period may be 24 hours.

In an embodiment, the information from the one or more data streams is stored in a hypercube that is spatially partitioned with geo hashes in terms of a key value data structure for one or more geo locations. In one embodiment, the hypercube includes heterogeneous collection of geo hashes. In one embodiment, the hypercube includes a combination of geo hashes at granularity. In one embodiment, the key value data structure is a HyperLogLog (HLL) data structure. In one embodiment, the key value data structure is maintained temporally on per day basis, per hour basis, or in a rolling 30-day window. In exemplary embodiment, a country is represented by $1\times10^6$ HLLs in the key value data structure that maintain a million keys for every day (similar for every 4-hour window). For a 30-day period, the key value data structure maintains 30 million keys.

In an embodiment, the identity management server 110 includes a geo coder that transforms the one or more data streams into geo location of the one or more entities 102A-N. In one embodiment, the one or more data streams include latitude data and longitude data. In one embodiment, the geo coder transforms the latitude data and the longitude data into geo location of the one or more entities 102A-N. In one embodiment, the geo location is represented in a form of geo hashes. In one embodiment, the geo coder uses a spatial kriging technique to transform the one or more data streams into the geo location of the one or more entities 102A-N. In one embodiment, the geo coder interpolates between two data points in the one or more data streams using the spatial kriging technique to identify the geo location of the one or more entities 102A-N. The one or more data streams includes partial data.

In an exemplary embodiment, given two entities 102A and 102B with attributes $i_1$, $a_1$, $a_2$ until an where i is an entity identifier, it is established whether entity 102A and entity 102B are the same entities and thus link the identifiers. A mapping of identifiers ($i_1 \rightarrow i_2$, $i_1 \rightarrow i_3$ and so on) wherein each identifier is a particular type of identifier is collectively called a device graph. In an embodiment, the attributes a1, a2 etc. can be static and are known a priori or available from a streaming source and change with time. In the context of linking identifiers across data streams, attributes such as IP address, time, application or website, location is available in the one or more data stream for a given identifier across various data sources. These attributes change as entities switch apps, locations etc.

In an embodiment, the disambiguation module 204 further assigns a score to the obtained candidate pair of identifiers on the basis of a shared history of the identifiers, a location and the entity devices that correspond to the sub-clusters using a machine learning classifier that enables reduction of a count of candidate pair of identifiers which need evaluation. Further, the disambiguation module 204 filters the candidate pair of identifiers using the machine learning classifier by comparing the score of candidate pair of identifiers with a predetermined threshold value. The validation module 206 refines the unique entity identifier in real-time using a feedback loop to engage with the entity associated with the unique entity identifier based on a test engagement activity and deduplicates the data streams that are associated with the unique entity identifier in real time by validating entity attributes linked with the unique entity identifier with the attributes observed in a first data stream and a second data stream of the test engagement activity. The entity attributes include but not limited to an age, a gender, an occupational, a countable, a categorical, an ordinal, location, a spatial and temporal behavior or financial status of the entity. In an embodiment, the disambiguation module 204 also maps the unique entity identifier to all behavioral attributes that are associated with all the entity identifiers that are linked with the unique entity identifier. In an embodiment, the disambiguation module 204 runs in real-time and the data is continuously refreshed which enables the compensation of highly dynamic data. The validation module 206 validates the entity attributes obtained from behavior signals of the one or more identifiers that are associated with the unique entity identifier of the single entity. In an exemplary embodiment, a unique entity identifier "1001" has categorical attributes known to be a male, has a mobile identifier "1001_m" and has a plurality of cookie identifiers namely "1001_c_1", "1001_c_2", "1001_c_3" associated with it. The validation module 206 validates which cookies truly map to this mobile identifier "1001_m". The above set of identifiers is generated from 3 candidate pairs which are a union of (1001_m, 1001_c_1), (1001m, 1001_c_2) and (1001_m, 1001_c_3). The validation module 206 runs an engagement activity that targets a male segment for which the unique entity identifier "1001" is a member. Further, the validation module 206 runs an engagement activity on mobile device identifiers which includes targeting the unique entity identifier 1001_m and also a cookie engagement activity consisting of all the cookies that are linked with the unique entity identifier "1001" on a first data stream and a second data stream. The validation module 206 validates if a positive engagement is received on both the first and the second data stream for both the mobile identifier "1001" and set of cookies identifiers, it is validated that they both refer to the same entity.

In an embodiment, the disambiguation module 204 employs a machine learning classifier. The machine learning classifier uses training data to develop a score to indicate a similarity of a candidate pair of identifiers. If the score is greater than a threshold, the candidate pair of identifiers is considered to refer to the same entity. The training data for building this machine learning classifier are obtained from a plurality of data sources and is validated. Use of the machine learning classifier enables filtering in the number of candidate pairs of identifiers that need to be evaluated.

In one embodiment, the entity attributes of an entity 102 associated with the unique entity identifier includes at least one of a gender, an age-group, a frequency of visits, a profile category, a content category, a content type, a time period per day, a time interval, a spatial location of residential region, a spatial location of points of interest, spatial location of place categories, a weekday versus weekend, or an ID type across stream. In one embodiment, the one or more data streams may include at least one of non-location indexed traffic data, digital visit count to global website, or social media activities. The one or more data streams of the entity from the one or more data sources are de-duplicated based on the unique entity identifier.

In an embodiment, the identity management server 110 comprises an event classifier module that classifies a unified entity event from the one or more of data streams along with dynamic entity attributes retrieved from a distributed memory store. In one embodiment, the unified entity event includes the values of the entity attributes.

In an exemplary embodiment if a first entity device and a second entity device are mapped to the same unique entity identifier but the validation module 206 in real-time observes that the entity attributes of the first entity device suggests that the entity is a female of age between the range 26-35 while the entity attributes of the second entity device indicates that the entity associated with the second device is a male of age 45 and above, then this leads to a mismatch. In case of such exemplary embodiment, the identity management server 110 runs the clustering module 202 and the disambiguation module 204 again.

In an embodiment, the dimensions of an entity along with which the validation happens include but not limited to home location, spend behavior, demography, content consumption, closed-loop feedback from campaigns.

In an embodiment, along with data streams, an additional contextual data about identifiers and the corresponding entity behaviors are used to filter and rank candidate pair identifiers using a data fusion and Bayesian updating technique for enabling temporal additivity with changing entity behavior.

Figure 3:
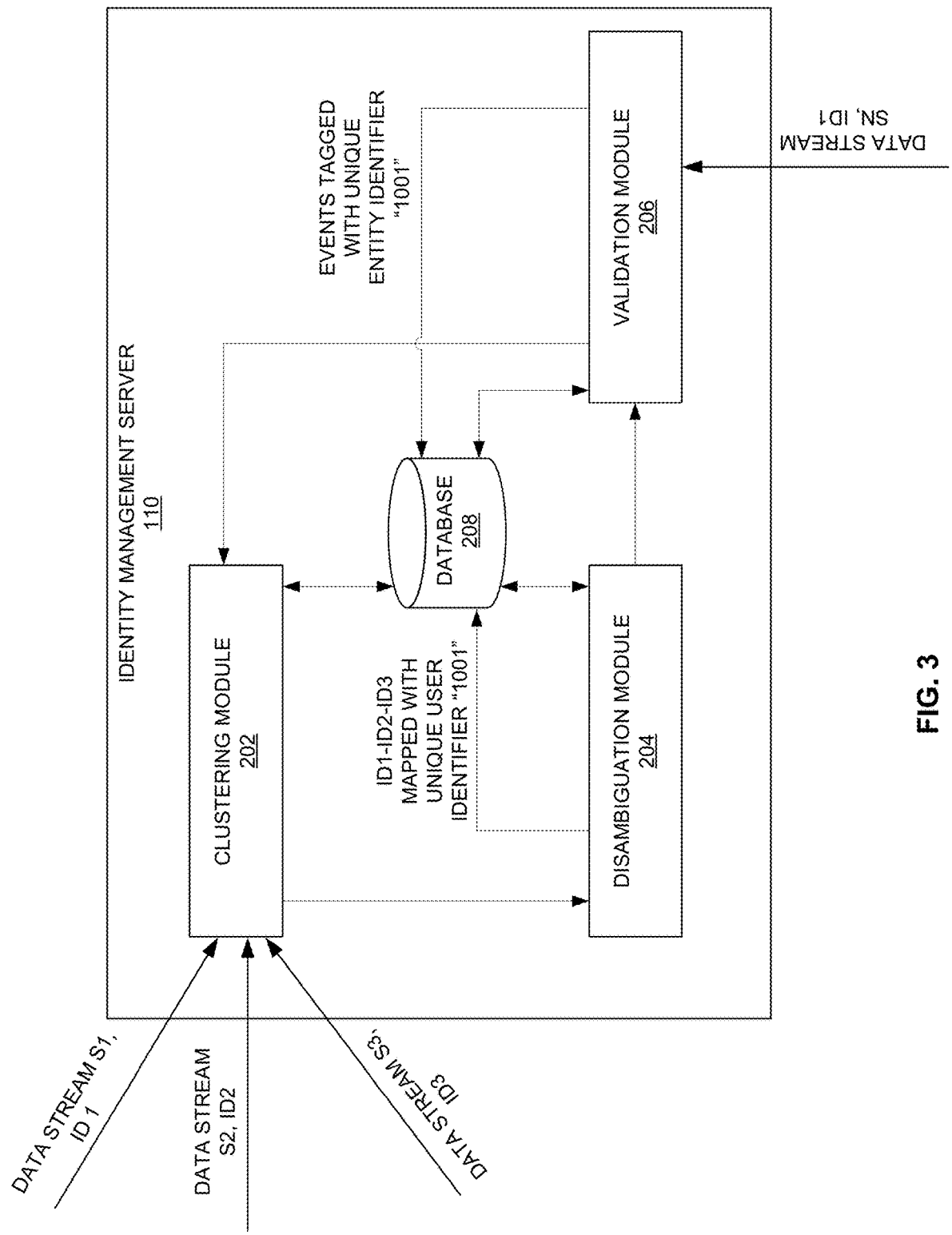
FIG. 3 illustrates deduplication of a data stream by the identity management server of FIG. 1 in real-time, according to an embodiment herein.

FIG. 3 illustrates deduplication of a data stream by the identity management server of FIG. 1 in real-time, according to an embodiment herein. In an embodiment, a data stream "S1" associated with an identifier "ID2", a data stream "S2" associated with an identifier "ID1" and a data stream "S3" associated with an identifier "D3" are obtained at the identity management server 110. The clustering module 202 uses an unsupervised machine learning to cluster entity devices by identifying one or more entity devices having an association with each other in at least one of an internet protocol address, a real-time event, a period of time or a location. The disambiguation module 204 analyses the clusters obtained from the clustering module 202 and identifies sub-clusters that resolve to a single entity. The single entity owns all the devices that exist in the sub-cluster and generates a unique entity identifier "1001" which corresponds to a single entity. The identity management server 110 obtains a data stream "SN" associated with the identifier "ID1" in real-time and the validation module 206 validates identifier "ID1" as being mapped with the unique entity identifier 1001 and deduplicates the data stream "SN" in real-time.

In an exemplary embodiment, a unique entity identifier "1001" has categorical attributes known to be a male, has a mobile identifier "1001_m" and has a plurality of cookie identifiers namely "1001_c_1", "1001_c_2", "1001_c_3" associated with it. The validation module 206 validates which cookies truly map to this mobile identifier "1001_m". The above set of identifiers is generated from 3 candidate pairs which are a union of (1001_m, 1001_c_1), (1001m, 1001_c_2) and (1001_m, 1001_c_3). The validation module 206 runs an engagement activity that targets a male segment for which the unique entity identifier "1001" is a member. Further, the validation module 206 runs an engagement activity on mobile device identifiers which includes targeting the unique entity identifier 1001_m and also a cookie engagement activity consisting of all the cookies that are linked with the unique entity identifier "1001" on a first data stream and a second data stream. The validation module 206 validates if positive engagement is received on both the first and the second data stream for both the mobile identifier "1001" and set of cookies identifiers, it is validated that they both refer to the same entity. In an embodiment, the validation module 206 dynamically validates two or more data streams by checking equivalence in the engagement of the ID streams.

Figure 4:
FIG. 4 is an exemplary clustering data table generated by a clustering module of the identity management server of FIG. 2 according to an embodiment herein.

FIG. 4 is an exemplary clustering data table generated by a clustering module 202 of the identity management server 110 of FIG. 2 according to an embodiment herein. In an embodiment, the clustering module 202 identifies and clusters the entity devices with an identifier that are seen together using a single IP address, within a given time-window. The identifier includes but not limiting to an advertisement identifier, cookie identifier, social media identifier, etc. Further, the clustering module 202 identifies and clusters the entity devices with the identifier that are seen together using the single IP address, within the given time-window and within the same location. The exemplary clustering table is a simplified view that shows the process occurring in the clustering module 202, while there are cluster in the range of hundreds of thousands that appear in a particular location every day and devices in the range of millions form part of the clusters.

In an exemplary embodiment, an entity John owns five devices, namely a laptop having a cookie identifier C1, an iMac device having a cookie identifier C2, an android device having a device identifier P1, an iPhone device having a device identifier P2 and a tablet device having a device identifier T1. The clustering module 202 identifies all possible clusters that these devices form a part of. Hence, John's devices correspond to the following identifiers: C1, C2, P1, P2, and T1. In accordance with the exemplary illustration in FIG. 4, over 300 identifiers including cookie IDs and device IDs are observed at SOHO location in the morning time, which corresponds to a single cluster. At noon time, another cluster appears at Pret a Manger, where one or more entities are seen for meetings or lunch. Three of John's IDs namely C1, P1, P2 appear at Pret a Manager location as part of the second cluster. Yet another cluster appears at Virgin Active location in the evening time where a plurality of smartphone identifiers is observed along with P1, P2, and T1 using an IP. Similarly, at late night time, another cluster is seen at Mayfair location, and C1, P1, and T1 appear again.

In an embodiment, the clustering module 202 identifies and builds the clusters over time and the disambiguation module 204 runs in parallel.

FIG. 5 is an exemplary disambiguation data table generated by a disambiguation module 204 of the identity management server 110 of FIG. 2 according to an embodiment herein. In an embodiment, the disambiguation module 204 analyses the clusters obtained from the clustering module 202 and identifies sub-clusters that resolve to a single entity. The single entity owns all the devices that exist in the sub-cluster. In an embodiment, the unique entity identifier is also mapped to a home location of a single entity which enables the persistence of the unique entity identifier compared to traditional anonymized identifiers.

In an exemplary embodiment of John corresponding to the FIG. 5, the five identifiers namely C, C2, P1, P2, and T1 are typically observed together in the incoming data streams and form part of a plurality of clusters together. The disambiguation module 204 links these five identifiers and maps them to the unique entity identifier "9517ANR". Further, the validation module 206 also maps the unique entity identifier 9517ANR to all behavioral attributes that are associated with all the entity identifiers that are linked, such as male, 26-35, business professional, fitness freak, affluent, gamer, loves soccer and tennis.

The disambiguation module 204 analyses available clusters and starts to disambiguate or discern patterns of the identifiers that are observed to always be together in spatio-temporal occurrences.

In an embodiment, the validation module 206 runs multiple engagement activities in a concurrent manner. Further, after running multiple engagement activities concurrently, the results of the engagement activities enable the filtering of non-engaged identifiers.

In an embodiment, the validation module 206 obtains best results in campaign execution for which it is critical that the unique entity identifier generation and validation happen in real-time and the data in the database 208 is updated with the latest data in real time. Otherwise, it leads to the degradation of the unique entity identifiers in the identity management server 110 and leads to issues because of dynamic nature of data streams. This feedback process can be run as part of engagement activities or as test campaigns periodically on a daily, weekly and monthly basis to validate the combined candidate pairs. In real-time engagement activities, the validation module 206 accounts for sparse feedback data where only about 10-15% data obtained may be a valid data. In an embodiment, the validation module 206 runs every day to cope with dynamic identifiers.

In an embodiment, offline data from a new source is on-boarded to data available in the database 208. In an embodiment, the identity management server 110 creates and maintains a private unique entity identifier graph for the new source by running the on-boarded offline data in the identity management server 110. In an embodiment, the data from the new source may include cookie stream, a mobile application usage stream, etc.

Figure 6B:
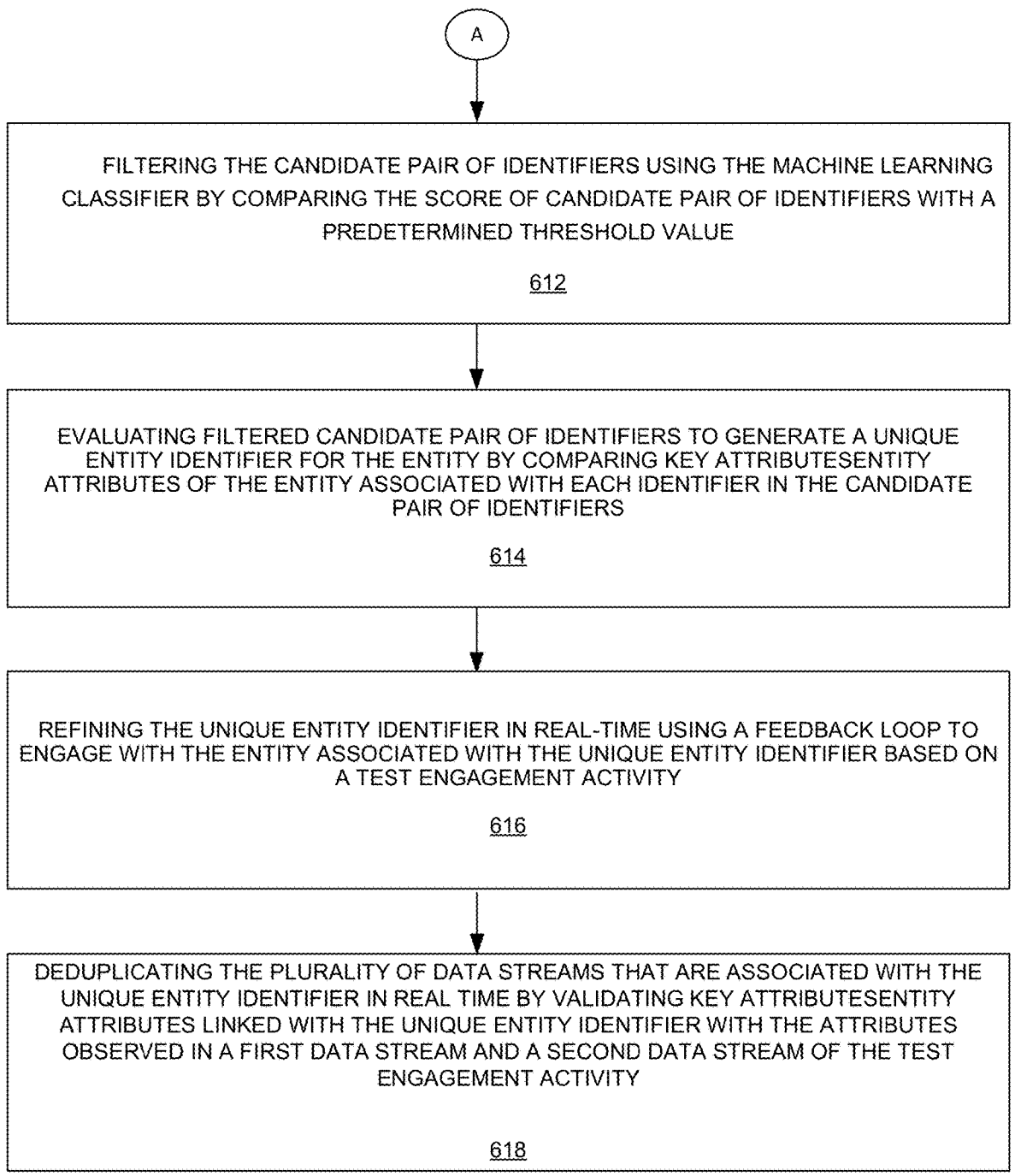

FIGS. 6A and 6B are flow charts describing a method for linking identifiers associated with data streams to generate a unique entity identifier for deduplicating high-speed data streams in real time. At step 602, a plurality of data streams with at least one identifier from independently controlled entities is obtained in real time. The plurality of data streams comprises timestamp data and location indexed data that partially characterizes an activity of an entity associated with the unique entity identifier. At step 604, at least one of a home location or an internet protocol address of the entity associated with the at least one identifier is determined by analyzing data obtained from the plurality of data streams. At step 606 the plurality of entity devices is clustered in real-time, using unsupervised machine learning model, based on an association between the entity devices in at least one of an internet protocol address, a real-time event, a period of time or a location. At step 608, the clusters of entity devices is disambiguated into sub-clusters that resolve to an entity by analyzing data streams until a candidate pair of identifiers is obtained. At step 610, a score for the candidate pair of identifiers is generated using a machine learning classifier based on at least one of a shared history of the identifiers, a location and the entity devices that correspond to the sub-clusters to discern the candidate pair of identifiers into to same or different entity. At step 612, the candidate pair of identifiers is filtered, using the machine learning classifier, by comparing the score of candidate pair of identifiers with a predetermined threshold value. At step 614, the filtered candidate pair of identifiers is evaluated to generate a unique entity identifier for the entity by comparing entity attributes of the entity associated with each identifier in the candidate pair of identifiers. At step 616, the unique entity identifier is refined in real-time using a feedback loop to engage with the entity associated with the unique entity identifier based on a test engagement activity. At step 618, data streams that are associated with the unique entity identifier is deduplicated in real time by validating entity attributes linked with the unique entity identifier with the attributes observed in a first data stream and a second data stream of the test engagement activity.

In an embodiment, the identity management server 110 captures the values of the entity attributes from the unified entity event in a document associated with the entity and compares the values of entity attributes in the unified entity event with the one or more segmentation rules by invoking one or more segmentation rules from a rules database. In an embodiment, the document includes all values of the entity attributes that have seen for the entity.

In an embodiment, the identity management server 110 profiles the entity by reverse searching to match the document associated with the entity with a one or more query that is applicable to the entity, the one or more query includes segment definition comprising entity attributes in Boolean logic. The identity management server 110 provides segment labels to the matched documents.

In an embodiment, the identity management server 110 generates entity segments based on the matched document of the entities with the segment labels. In an embodiment, the entity segments are created based on a search segment definition.

In an embodiment, the identity management server 110 communicates a target media content to one or more entity devices associated with the entity segments over a network.

Figure 7:
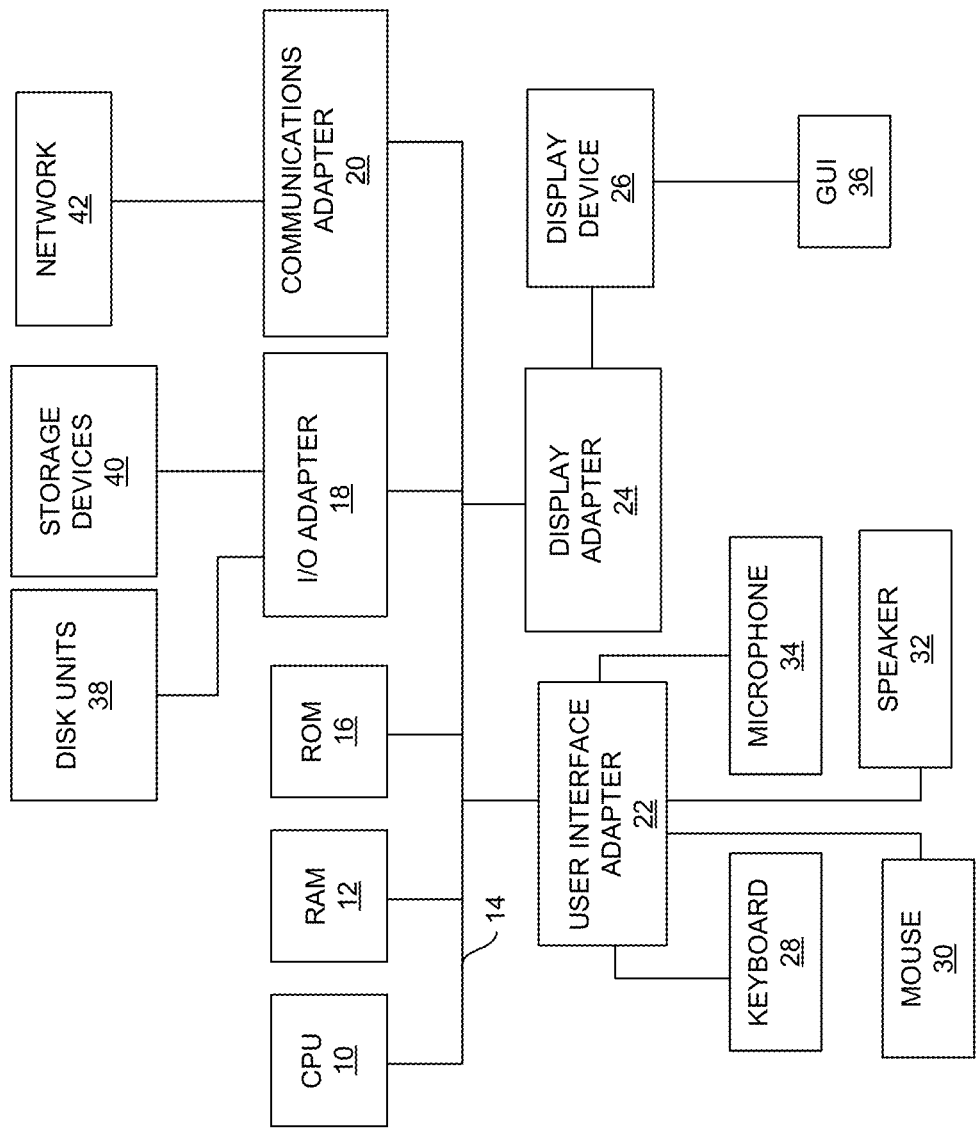
FIG. 7 is a schematic diagram of an entity device used in accordance with the embodiments herein.

A representative hardware environment for practicing the embodiments herein is depicted in FIG. 7, with reference to FIGS. 1 through 6B. This schematic drawing illustrates a hardware configuration of a server/computer system/computing device in accordance with the embodiments herein. The system includes at least one processing device CPU 10 that may be interconnected via system bus 14 to various devices such as a random access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and/or other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A processor-implemented method for linking device identifiers associated with data streams with a unique entity identifier for an entity that is using devices having the device identifiers, the method comprising:
   obtaining, in real time, data streams with at least one device identifier of a device, from independently controlled sources, wherein the data streams comprise timestamp data and location indexed data that partially characterizes an activity of an entity;
   generating, using an unsupervised machine learning model, clusters of device identifiers that are observed together in at least one of an internet protocol address, a real-time event, a period of time or a location;
   generating a set of candidate pairs of device identifiers from the clusters of device identifiers based on combinations of the device identifiers in the clusters;
   generating a similarity score for each of the candidate pairs of device identifiers in the clusters using a machine learning classifier based on a shared history of the device identifiers in the candidate pairs;
   comparing the similarity score of the candidate pairs of device identifiers with a predetermined threshold value;
   obtaining filtered pairs of device identifiers that have the similarity score greater than the predetermined threshold value, wherein the filtered pairs of device identifiers are determined to refer to the same entity;
   generating a unique entity identifier that links at least one of the filtered pairs of device identifiers with the entity;
   performing a test engagement activity on each device associated with at least one of the filtered pairs of device identifiers by engaging the entity that is linked with the at least one of the filtered pairs of the device identifiers; and
   validating the unique entity identifier in real-time based on a positive engagement in response to the test engagement activity to obtain a validated unique entity identifier for the entity that is linked with the at least one of the filtered pairs of the device identifiers.

2. The method as claimed in claim 1, wherein the data streams comprises at least one of (i) location pings from a plurality of applications engaged on the plurality of entity devices, (ii) access pings from wireless hot-spots, (iii) active subscriber's data & location in different geo-areas from a mobile network, or (iv) a local information from traffic sensors and public cameras.

3. The method as claimed in claim 1, wherein the data streams comprises event streams, wherein the event streams include a web traffic to a global website and a public activity on social media services.

4. The method as claimed in claim 1, wherein the unique entity identifier is refined in real time with respect to incoming data streams, wherein the method reruns if inconsistent data is observed.

5. The method as claimed in claim 1, wherein personally identifiable information and non-personally identifiable information of the entity are linked with the unique entity identifier.

6. The method as claimed in claim 1, further comprises linking the unique entity identifier of the entity to the home location of the entity for providing persistence to the unique entity identifier.

7. The method as claimed in claim 1, further comprises filtering and ranking the candidate pair of identifiers using a data fusion and a Bayesian updating technique based on an additional contextual data corresponding to the entity identifiers and an entity behavior for enabling temporal additivity with changing entity behavior.

8. The method as claimed in claim 1, wherein a private unique entity identifier graph is created and maintained for a new data source by combining data from the new data source with data associated with the unique entity identifier.

9. The method as claimed in claim 1, wherein the at least one device identifier comprises at least one of an advertisement identifier, a cookie identifier or a social media identifier.

10. A system for linking device identifiers associated with data streams with a unique entity identifier for an entity that is using devices having the device identifiers, the system comprising:
    an identity management server that obtains, in real time, data streams with at least one device identifier of a device, from independently controlled sources, wherein the data streams comprise timestamp data and location indexed data that partially characterizes an activity of an entity, the identity management server further comprising:
       a database that stores information including attributes, identifiers, data streams;
       a clustering module that generates, using an unsupervised machine learning model, clusters of device identifiers that are observed together in at least one of an internet protocol address, a real-time event, a period of time or a location;
       a disambiguation module that (i) generates a set of candidate pairs of device identifiers from the clusters of device identifiers based on combinations of the device identifiers in the clusters, (ii) a similarity score for each of the candidate pairs of device identifiers in the clusters using a machine learning classifier based on a shared history of the device identifiers in the candidate pairs, (iii) comparing the similarity score of the candidate pairs of device identifiers with a predetermined threshold value, and (iv) obtains filtered pairs of device identifiers that have the similarity score greater than the predetermined threshold value, wherein the filtered pairs of device identifiers are determined to refer to the same entity and
    a validation module that (i) generates a unique entity identifier that links at least one of the filtered pairs of device identifiers with the entity, (ii) performing a test engagement activity on each device associated with at least one of the filtered pairs of device identifiers by engaging the entity that is linked with the at least one of the filtered pairs of the device identifiers, and (iii) validates the unique entity identifier in real-time based on a positive engagement in response to the test engagement activity to obtain a validated unique entity identifier for the entity that is linked with the at least one of the filtered pairs of the device identifiers.

11. The system as claimed in claim 10, wherein the data streams comprises at least one of (i) location pings from a plurality of applications engaged on the plurality of entity devices, (ii) access pings from wireless hot-spots, (iii) active subscriber's data & location in different geo-areas from a mobile network, or (iv) a local information from traffic sensors and public cameras.

12. The system as claimed in claim 10, wherein the data streams comprises event streams, wherein the event streams include a web traffic to a global website and public activity on social media services.

13. The system as claimed in claim 10, wherein the unique entity identifier is refined in real time with respect to incoming data streams, wherein the system reruns if inconsistent data is observed.

14. The system as claimed in claim 10, wherein personally identifiable information and non-personally identifiable information of the entity are linked with the unique entity identifier.

15. The system as claimed in claim 10, wherein the system links the unique entity identifier of the entity to the home location of the entity for providing persistence to the unique entity identifier.

16. The system as claimed in claim 10, wherein the system filters and ranks candidate pair of identifiers using a data fusion and Bayesian updating technique based on an additional contextual data corresponding to the identifiers and an entity behavior for enabling temporal additivity with changing entity behavior.

17. The system as claimed in claim 10, wherein a private unique entity identifier graph is created and maintained for a new data source by combining data from the new data source is combined with the data associated with the unique entity identifier.

18. The system as claimed in claim 10, wherein the at least one device identifier comprises at least one of an advertisement identifier, a cookie identifier or a social media identifier.

19. A one or more non-transitory computer-readable storage mediums storing the one or more sequences of instructions, which when executed by the one or more processors, causes to perform a method for linking device identifiers associated with data streams with a unique entity identifier for an entity that is using devices having the device identifiers, wherein the method comprises:

obtaining, in real time, data streams with at least one device identifier of a device, from independently controlled sources, wherein the data streams comprise timestamp data and location indexed data that partially characterizes an activity of an entity;

generating, using an unsupervised machine learning model, clusters of device identifiers that are observed together in at least one of an internet protocol address, a real-time event, a period of time or a location;

generating a set of candidate pairs of device identifiers from the clusters of device identifiers based on combinations of the device identifiers in the clusters;

generating a similarity score for each of the candidate pairs of device identifiers in the clusters using a machine learning classifier based on a shared history of the device identifiers in the candidate pairs;

comparing the similarity score of the candidate pairs of device identifiers with a predetermined threshold value;

obtaining filtered pairs of device identifiers that have the similarity score greater than the predetermined threshold value, wherein the filtered pairs of device identifiers are determined to refer to the same entity;

generating a unique entity identifier that links at least one of the filtered pairs of device identifiers with the entity;

performing a test engagement activity on each device associated with at least one of the filtered pairs of device identifiers by engaging the entity that is linked with the at least one of the filtered pairs of the device identifiers; and validating the unique entity identifier in real-time based on a positive engagement in response to the test engagement activity to obtain a validated unique entity identifier for the entity that is linked with the at least one of the filtered pairs of the device identifiers.

* * * * *